Fig.1.

Dec. 18, 1928. 1,696,012
W. H. RAY
METHOD OF AND APPARATUS FOR INTERCONNECTING
AND TESTING ELECTRICAL APPARATUS
Filed April 10, 1926   8 Sheets-Sheet 7

Inventor
William H. Ray
by [signature]
Att'y.

Patented Dec. 18, 1928.

1,696,012

UNITED STATES PATENT OFFICE.

WILLIAM HARRY RAY, OF CHICAGO, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR INTERCONNECTING AND TESTING ELECTRICAL APPARATUS.

Application filed April 10, 1926. Serial No. 101,052.

This invention relates to methods of and apparatus for interconnecting and testing electrical apparatus, and more particularly to methods of and apparatus for soldering electrical conductors to telephone apparatus and testing the soldered connections.

In manually operated telephone exchange equipments, the telephone lines leading to the subscribers' stations are frequently provided with a plurality of multiple terminals accessible to a number of operators for establishing circuit connections therewith by means of plug terminated cords. These terminals which are called jacks are usually mounted in strip formation and comprise connecting elements designated as the tip, ring and sleeve contacting portions. The jacks of each strip are usually electrically interconnected with the preceding and succeeding jacks of the associated multiple arrangement by means of cables of electrical conductors soldered to the terminal portions of the jacks.

Heretofore, the soldering operation was usually performed on long benches where a group of persons worked together on a single set of interconnected cables. The soldered cables were then turned over to a second group of persons who inspected the soldered connections for various defects, such as solder reversals, solder crosses, broken wires, etc. Due to this arrangement, any defects that were detected could not be readily traced back to the workman who was responsible for them and it was therefore necessary to maintain a separate repair force for correcting such defects.

The principal objects of the present invention are the provision of an improved method of and apparatus for rapidly and efficiently interconnecting electrical apparatus with electrical conductors and contemporaneously determining the accuracy of the connections.

In accordance with the general features of one embodiment of the invention, individual means are provided for holding the jack strip and the cable form during the soldering and testing operations. Mechanism is also provided for causing the jacks of a strip to engage a corresponding number of self-centering plugs, which plugs are electrically connected to similar plugs associated with the jacks of a strip previously soldered to a cable form. The tip, ring and sleeve interconnections may be selectively and individually associated with testing lamps whereby the soldered connections may be readily and accurately tested by the workman during the soldering operation. The cables and jacks may be maintained under test conditions during the soldering operation.

Other features and advantages of the invention will become apparent from the following detailed description, reference being had to the accompanying drawings, wherein.

The invention is herein illustrated and described in connection with an apparatus for soldering a cable form comprising a plurality of electrical conductors to the individual jacks of a telephone jack strip. It should be understood, however, that the novel features of the invention are capable of various other applications and the invention should be limited only in so far as defined by the appended claims.

In order to effect a saving of floor space, the improved soldering and testing apparatus is preferably built with a plurality of units positioned back to back and mounted upon the same supporting frame. However, since the individual units are similar in construction and in operation, it is thought that a detailed illustration and description of one complete unit will suffice.

Figure 1:
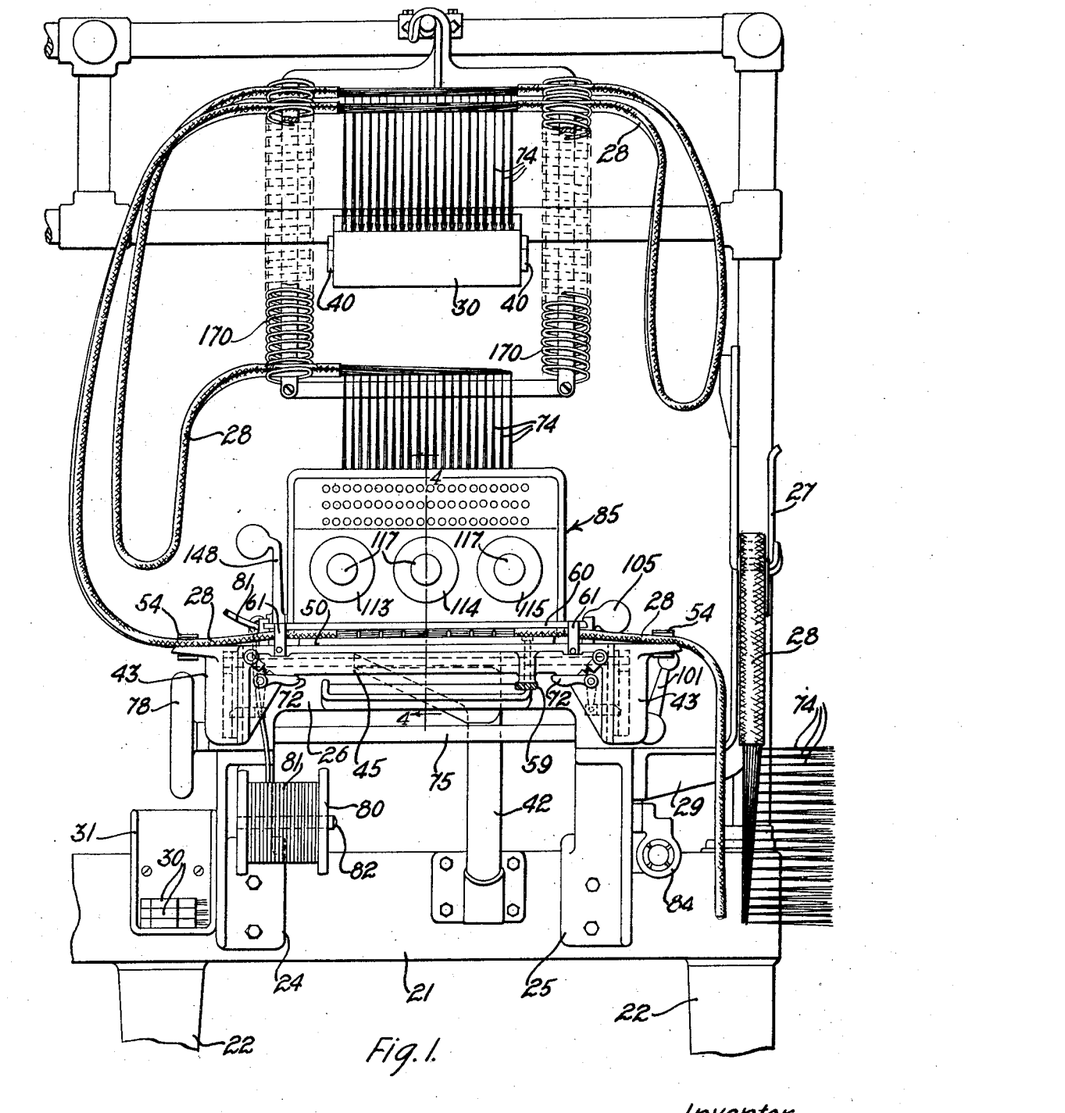
Fig. 1 is a front elevational view of an apparatus embodying the features of the invention.
Figure 2:
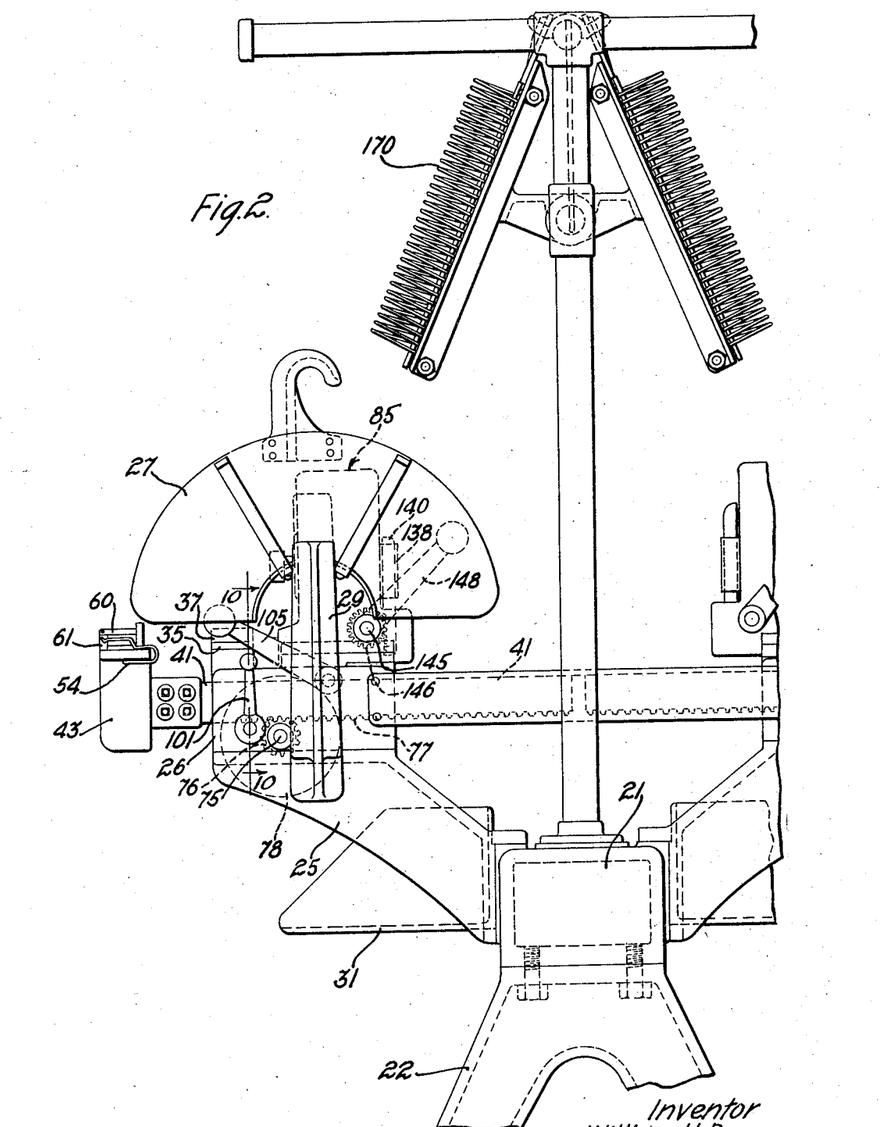
Fig. 2 is an end elevation thereof.

Referring now to the drawings in detail and particularly to Figs. 1 and 2 thereof, the improved apparatus is supported upon a frame which comprises a horizontally disposed duct or tubular member 21 supported upon a plurality of supporting legs 22, the length of the member 21 and the number of supporting legs 22 depending upon the number of units to be supported thereby. Secured to brackets 24 and 25 fastened to the frame member 21 is a horizontally disposed bench-like member 26 for supporting the apparatus of one complete unit. A holder 27 designed to hold a supply of cable forms 28 is removably supported by a bracket 29 secured to the bracket 25. A supply of jack strips 30 are maintained within convenient reach of the workman in a suitable receptacle 31 fastened to the frame member 21.

Figure 3:
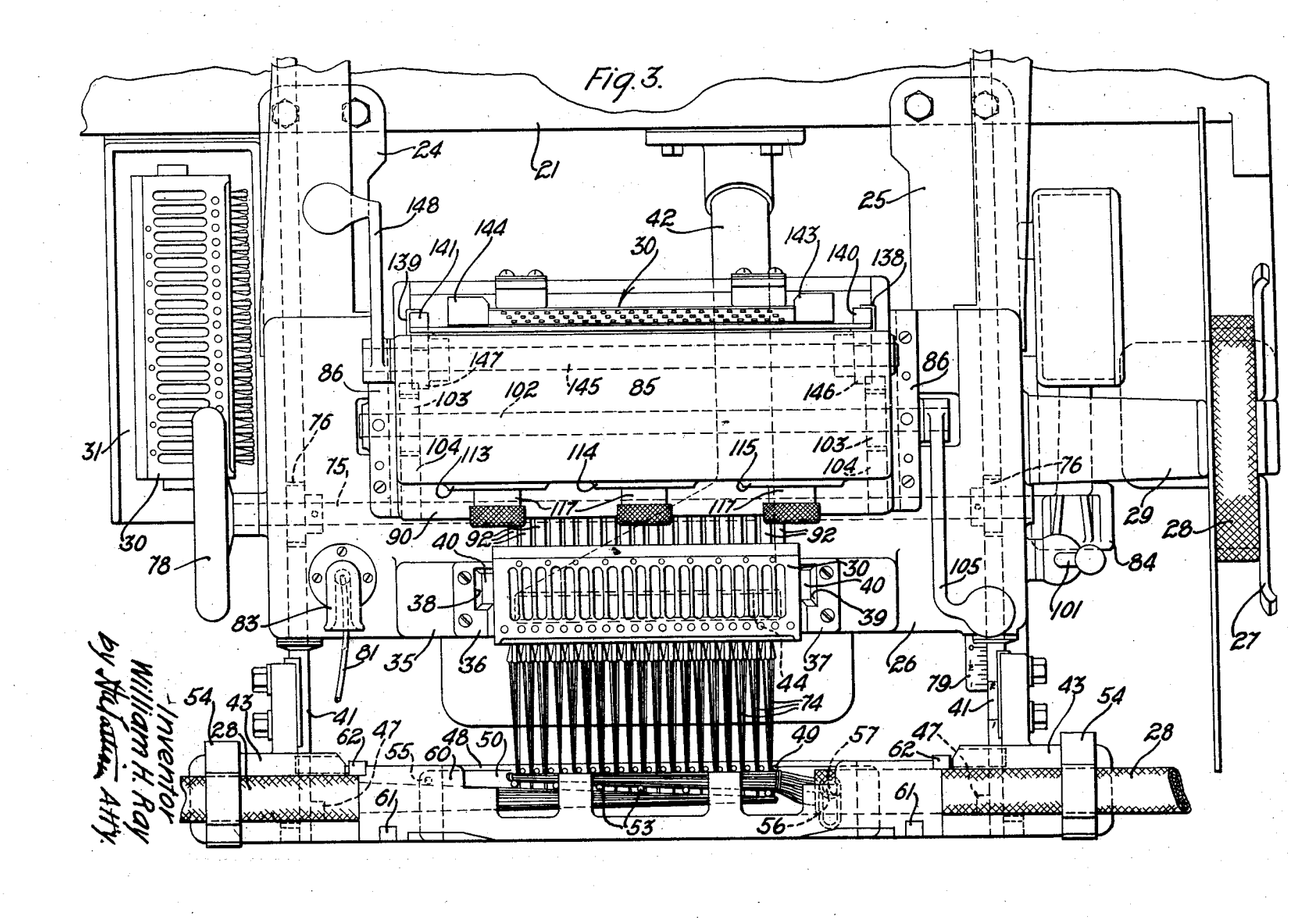
Fig. 3 is an enlarged plan view thereof.

Securing upon the upper surface of the member 26 is a steel plate 35 having a pair of blocks 36 and 37 fastened thereto (Fig. 3). The blocks 36 and 37 are positioned to hold a jack strip 30 therebetween and are provided with cooperating tapered grooves 38 and 39, respectively, which are designed to receive the outwardly projecting lugs 40 of a jack strip to properly position it for the soldering and testing operations.

A suitable pipe or conduit 42 (Figs. 1 and 4) is connected, at one end, to a screened slot 44 formed in the member 26 immediately below the plate 35. The opposite end of the conduit 42 communicates with the passage in the duct member 21, which passage is connected to a suitable exhaust fan (not shown). This provides a means for removing the smoke and fumes produced from the soldering flux during soldering operations.

Figure 8:
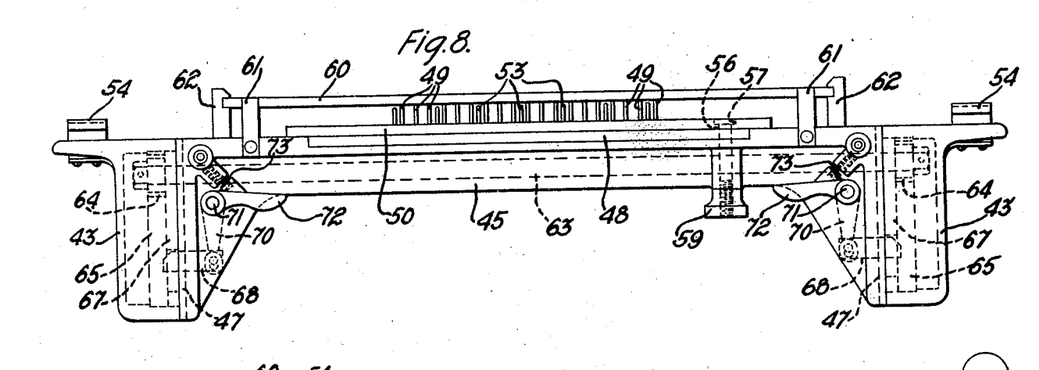
Fig. 8 is an enlarged front elevation of the cable form supporting members.

Slidably journaled in the member 26 are a pair of horizontally disposed parallel bars 41, 41 each having a chambered bracket 43 fastened at its forward end. A supporting member 45 is supported between the brackets 43 so as to be slidable along vertically disposed guides 47 (Figs. 3 and 8) fastened on the inner faces of the brackets. Disposed within a recess formed in the top surface of the member 45 is a plate 48 provided with a plurality of guide pins 49, the function of which will presently appear. Positioned immediately above the plate 48 is a second plate 50 having secured thereto a plurality of pins 53 similar to the pins 49. The two cable forms 28 which are to be interconnected by a jack strip 30 are inserted in spring clips 54 fastened to the brackets 43 and are disposed upon the plate 50 so that the formed ends thereof lie on opposite sides of the pins 53. The plate 50 is pivoted, at one end, upon a pin 55 (Fig. 3) projecting through the top of the member 45, and its free end is adjustable so that the pins 53 may be moved toward or away from the pins 49 to snugly grip the cable form therebetween. A clamping pin 56 journaled in the member 45 engages a shouldered slot 57 formed in the free end of the plate 50. A knurled nut 59 threaded on the lower end of the pin 56 serves as a means for securing the plate 50 in its adjusted position.

Suitably spaced above the plate 50 is a cover plate 60 which is hinged to vertical posts 61 secured at each end of the member 45. The plate 60 may be locked in its closed position by means of a pair of resiliently mounted latches 62 positioned at either end thereof. When in its closed position, this plate serves as a hand rest for the workman during the threading and soldering operations.

Figure 9:
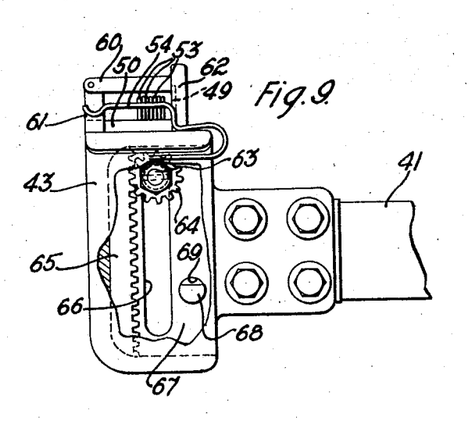
Fig. 9 is an end view, partly in section, thereof.

The member 45 together with the cable supporting plate 50 may be lowered along the vertical guides 47 to facilitate the removal of the cable form after the soldering and testing operations have been completed. The mechanism for accomplishing this comprises a horizontal shaft 63 rotatably journaled within the member 45 and having secured at each end a pinion 64 which meshes with a rack 65 secured within the chambered bracket 43. Vertical movement of the shaft 63 is guided by a vertical slot 66 (Fig. 9), formed in plates 67 fastened to the brackets 43. When the member 45 is in its lowermost position, the shaft 63 engages the bottom of the slot 66. The member 45 may be locked in operative position by means of a pair of resiliently mounted latches 68 engaging apertures 69 formed in the plates 67. The latches 68 are each pivoted at one end of a lever 70 which is secured, at its opposite end, to a pin 71 rotatably journaled in the member 45. A hand lever 72, secured to the pin 71, serves as a means for conveniently disengaging the latch 68 from the slot 69 when it is desired to lower the member 45. A compression spring 73 engaging the hand lever 72 serves to normally hold the latch 68 in its engaged position.

Figure 10:
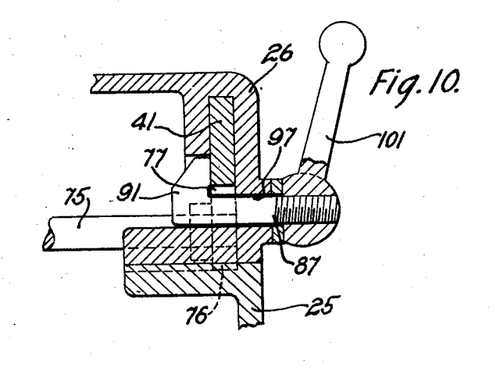
Fig. 10 is an enlarged fragmentary detail section taken on line 10—10 of Fig. 2.

In order to accommodate cable forms having leads 74 of various lengths, mechanism is provided for moving the member 45 towards or away from the jack strip supporting plate 35. Keyed at each end of a horizontal shaft 75 rotatably journaled in the frame member 26 is a pinion 76 meshing with rack teeth 77 formed on the bottom sides of the bars 41 (Figs. 2 and 3). The shaft 75 is rotated by means of a hand wheel 78 secured at one end thereof. It is apparent that rotation of the shaft 75 in a clockwise or counter-clockwise direction (Fig. 2) causes movement of the member 45 towards or away from the plate 35. The top surface of one of the bars 41 and a forwardly projecting portion 79 of the member 26 may be suitably calibrated as shown in Fig. 3 so that the member 45 may be accurately positioned for leads of a predetermined length. The member 45 may be locked in any position by means of a clamping stud 87 (Fig. 10) having an enlarged head portion 91 formed at one end. The stud 87 is mounted in an aperture 97 formed in the member 26 and is threaded at the end opposite the head 91 to receive a hand lever 101. It is obvious that by turning the hand lever 101 the bar 41 may be firmly gripped between the inner side of the members 26 and the head 91 of the clamping stud.

A spool 80 carrying a supply of solder 81 is rotatably mounted on an arbor 82 supported by the bracket 24. The end of the solder protrudes through a guide tube 83 positioned above the frame member 26. A suitable holder 84 is provided for holding the soldering iron (not shown) while not in use.

Figures 4, 7:
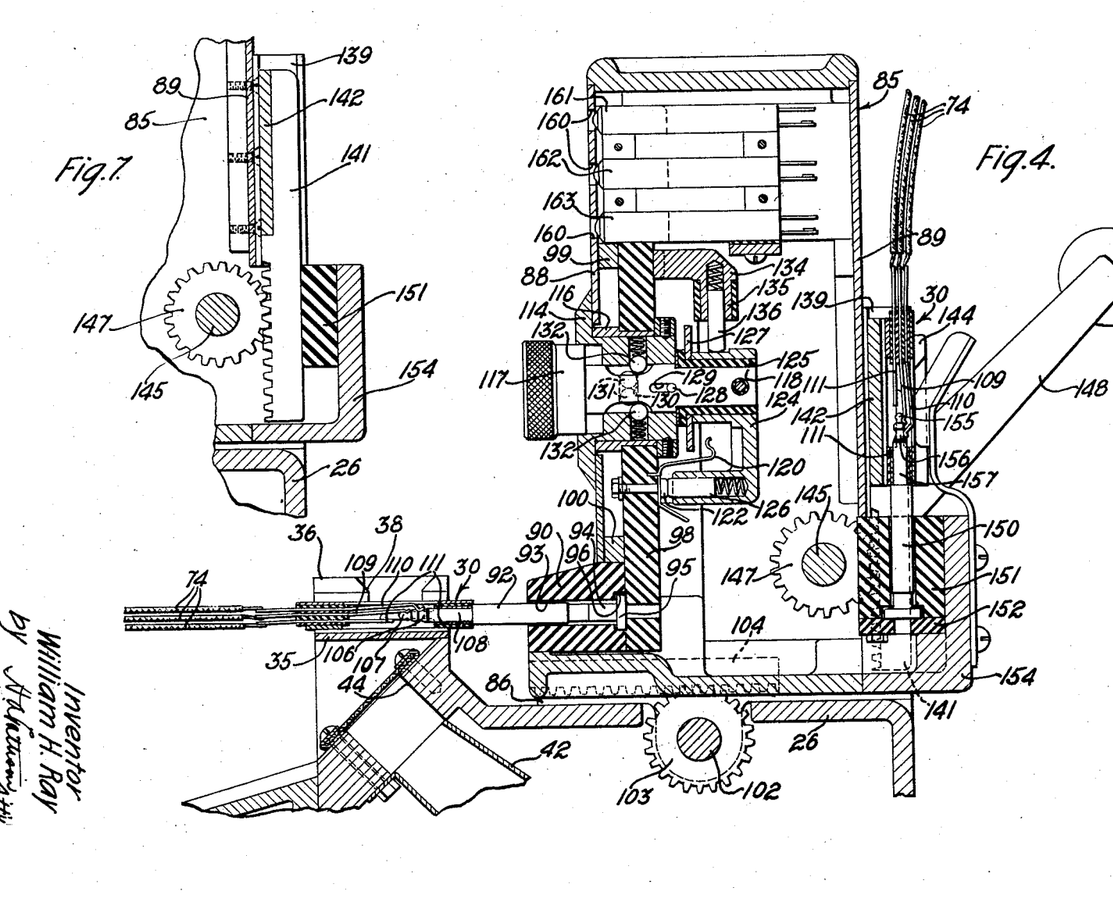
Fig. 4 is an enlarged fragmentary vertical section taken on line 4—4 of Fig. 1.
Fig. 7 is a fragmentary detail section taken on line 7—7 of Fig. 6.

The testing apparatus is enclosed within a substantially rectangularly shaped box 85 which is slidably mounted in guideways 86 fastened to the frame member 26. As shown in Fig. 4, the box 85 is provided with removable front and rear plate members 88 and 89, respectively, whereby access may be readily had to all parts contained therein. Secured to the base of the box 85 and extending across the front side thereof directly below the front plate member 88 is a fiber block 90. A plurality of plugs 92 protrude through the front side of the block 90 and are arranged in a horizontal row so that they are adapted to engage the jacks of the jack strip 30 when the test box is moved forwardly along the guideways 86. The plugs 92 may be of any well known construction suitable for electrical engagement with the jacks, and since this does not constitute a part of the present invention it is believed that a detailed disclosure and description thereof is unnecessary.

Referring particularly to Fig. 4, it will be noted that the plugs 92 fit loosely in apertures 93 formed in the fiber block 90 and are secured to tubular caps 94 having enlarged portions 95 which fit loosely in a rectangular recess 96 formed in the back face of the block. This construction provides a flexible mounting for the plugs whereby the jack engaging portions thereof are adapted to adjust themselves to slight variations in the construction of the jack mountings. The tubular caps 94 are retained within the recess 96 by a fiber plate 98 secured to the rear face of the block 90, which plate is suitably spaced from the front plate 88 by steel strips 99 and 100.

Figure 5:
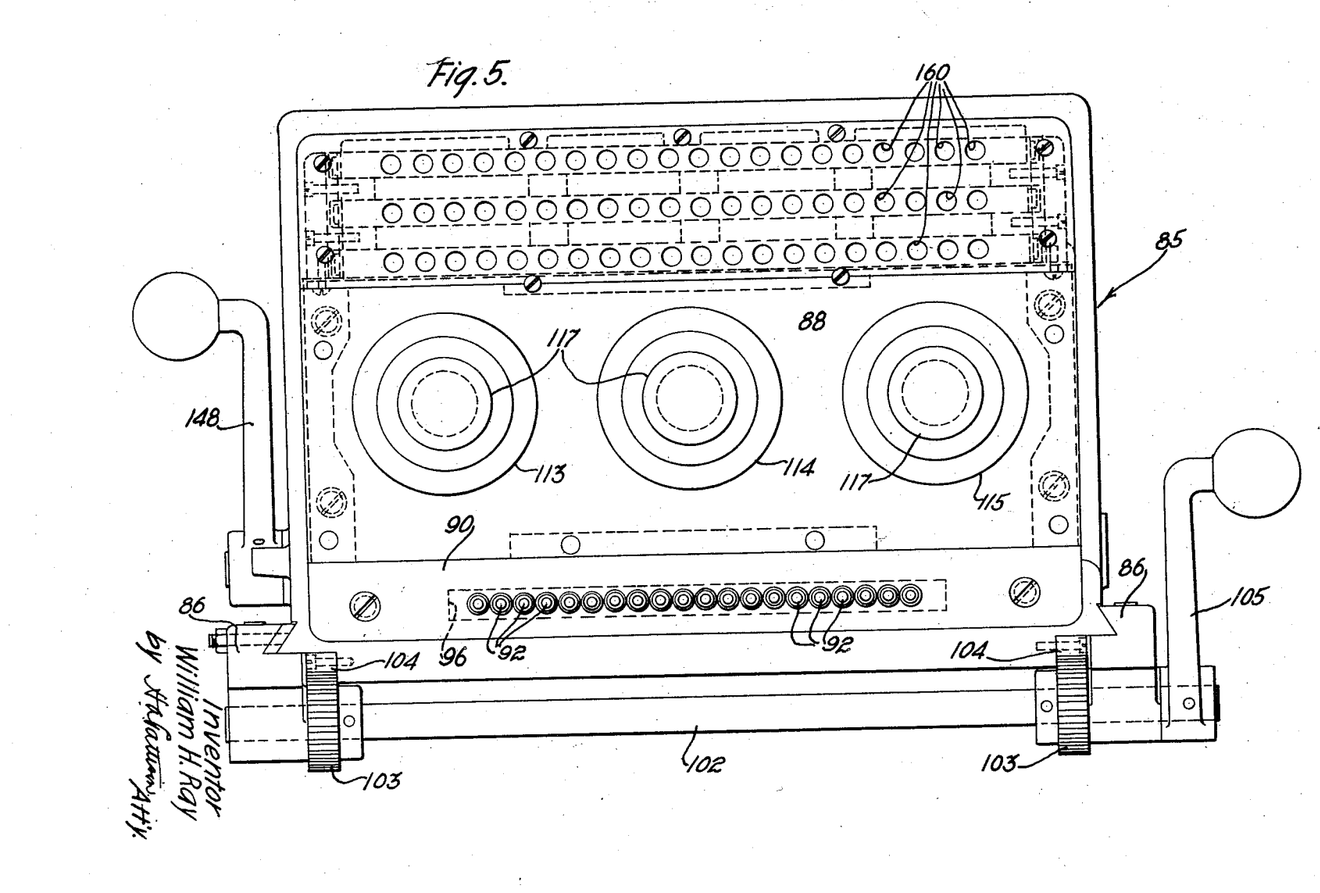
Fig. 5 is an enlarged front elevation of the testing apparatus.

The mechanism for moving the test box 85 along the guideways 86 to cause the plugs 92 to engage or disengage the jacks will now be described. Secured near each end of a horizontal shaft 102 rotatably journaled in the guideways 86 is a pinion 103 which meshes with a rack 104 secured on the under side of the box 85 (Figs. 4 and 5). Fixed at one end of the shaft 102 is a handle 105 whereby the shaft 102 may be conveniently rotated in either a counter-clockwise or clockwise direction (Fig. 4), moving the test box forwardly or rearwardly to operatively engage or disengage the jacks.

In the present embodiment of the invention, the plugs 92 are provided with tip, ring and sleeve contacting portions 106, 107 and 108, respectively, (Fig. 4) which are designed to electrically engage contact springs 109, 110 and 111, respectively, of the jacks when the test box is moved forwardly, as hereinbefore described.

Rotatably mounted in the fiber plate 98 are three dials 113, 114 and 115 having enlarged circular face portions resting on the front side of the plate member 88 (Figs. 3, 4 and 5). Each of these dials is rotatably journaled in a bearing 116 rigidly secured to the fiber plate 98 and is operated by means of a turning knob 117 having an elongated reduced portion 118 extending through the dial and projecting inwardly therefrom.

Figure 6:
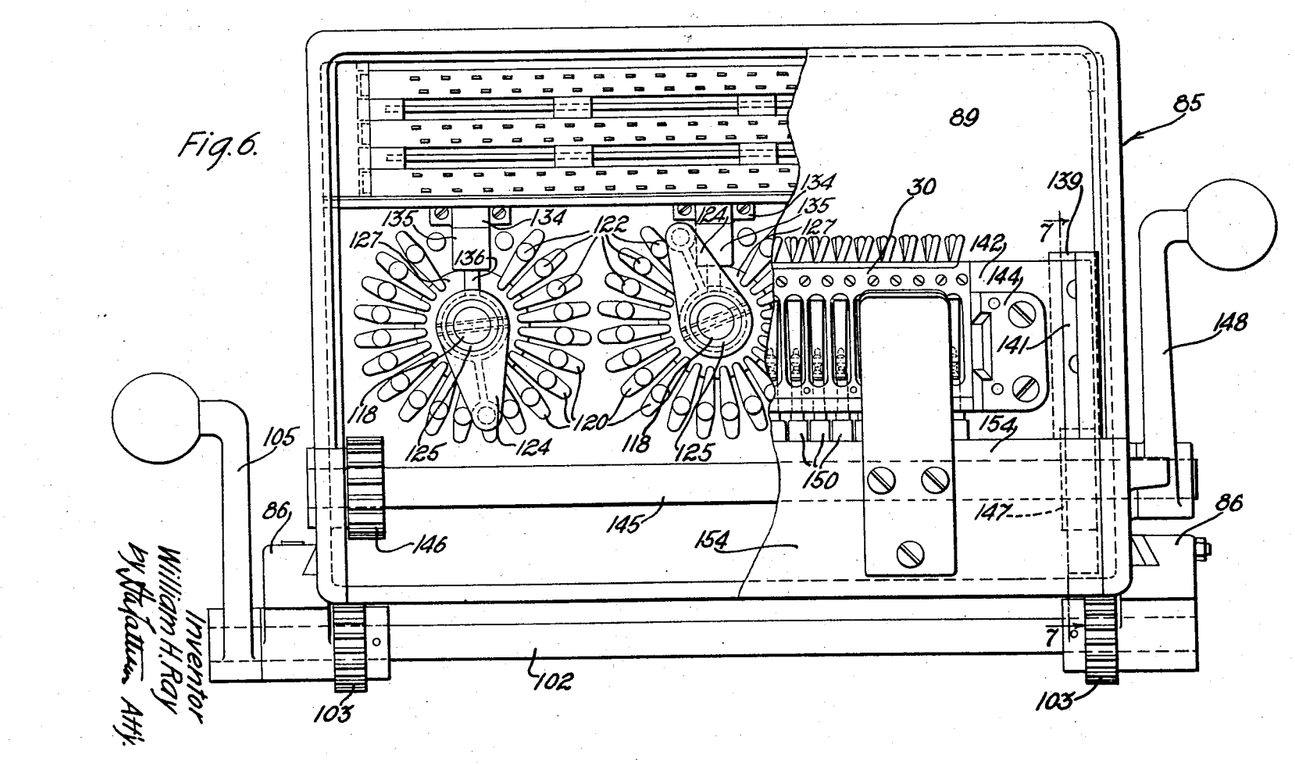
Fig. 6 is a rear view, partly in section thereof.

Secured on the inner side of the plate member 98 and arranged circumferentially about each of the dials 113, 114 and 115 are a plurality of contact springs 120 (Figs. 4 and 6). The contact springs associated with the dial 113 are individually interconnected with the tip contacting portions 106 of the plugs 92 by means of suitable electrical conductors (not shown). In a similar manner, the contact springs associated with the dial 114 are individually interconnected with the ring contacting portions 107 of the plugs 92 and the contact springs associated with the dial 115 are individually interconnected with the sleeve contacting portions 108 of the plugs.

Associated with each of the contact springs 120 and serving to secure the latter to the plate 98 is a contact pin 122. A lever 124, composed of a suitable electrical conducting material, is secured to the inwardly projecting portion 118 of each knob 117 and insulated therefrom by a fiber bushing 125. The lever 124 carries, at its free end, a yieldable contact brush 126 adapted to be selectively interconnected with the contact pins 122 associated therewith.

Secured to each of the knobs 117 and insulated therefrom by means of the fiber bushing 125 is a metal contact disk 127 which is permanently in electrical engagement with the lever 124. Each of the knobs 117 is movable longitudinally with respect to its dial whereby the contact springs 120 associated therewith may be collectively interconnected with or disconnected from the associated contact disk 127. A pin 128 secured to each of the dials rides in an elongated slot 129 formed in the portion 118 of each knob 117. When the knob 117 is in its outwardly projected position, as shown in Fig. 4, the contact disk 127 is disengaged from the contact springs 120 and the contact brush 126 is positioned so that it may be selectively engaged with each of the contact pins 122 associated therewith by turning the knob 117. When the knob is in its inwardly projected position, the contact disk 127 engages all of the contact springs 120 associated therewith.

Mounted in a slot 130 formed in the portion 118 of the knob 117 are a pair of steel balls 131 each of which is yieldably engaged by a spring pressed steel ball 132 carried by the dials. The balls 131 protrude from opposite sides of the slot 130 into arcuate openings formed between each of the dials and its associated turning knob 117. This construction provides a means for yieldably holding the knob 117 in its extreme outwardly and inwardly projected positions.

Secured on the rear side of the plate member 98 directly above each of the levers 124 is a metal contact bracket 134 having a downwardly projecting portion 135 within which is mounted a spring pressed contact brush 136. The contact brush 136 is designed to constantly engage the lever 124, thereby providing a permanent electrical connection between the contact brush 126, the contact disk 127, and the bracket 134.

Slidably mounted in guideways 138 and 139 secured at opposite ends of the rear plate member 89 are a pair of vertically disposed racks 140 and 141. Attached to the racks 140 and 141 is a steel plate 142 having fastened thereto a pair of oppositely disposed mounting blocks 143 and 144 similar to the mounting blocks 36 and 37 and arranged to hold a jack strip 30 therebetween in a vertical position, as clearly shown in Figs. 3 and 6. Secured to a horizontally disposed shaft 145 journaled in suitable bearings formed in the test box framework are a pair of pinions 146 and 147 meshing with the teeth formed in the racks 140 and 141, respectively. Also keyed to the shaft 145 is a hand lever 148 whereby the pinions 146 and 147 may be rotated to cause a vertical movement of the plate 142.

A plurality of vertically disposed plugs 150 similar to the plugs 92 are mounted in fiber blocks 151 and 152 carried by a supporting member 154 secured to the base of the test box 85 (Figs. 4 and 6). The plugs 150 are mounted similarly to the plugs 92 and are arranged to engage the jacks of a jack strip mounted in the blocks 143 and 144 when the plate 142 is moved downwardly as hereinbefore described. Referring particularly to Fig. 4, it will be noted that the plugs 150 are provided with tip, ring and sleeve contacting portions 155, 156 and 157, respectively, which are designed to electrically engage the contact springs 109, 110 and 111, respectively, of the jacks in a manner similar to that described in connection with the plugs 92.

Suitably supported in the upper portion of the test box and aligned with suitable apertures 160 formed in the front plate 88 are a plurality of test lamps 161, 162 and 163, which in the present embodiment of the invention are arranged into three horizontal rows (Figs. 4 and 5). It will appear from the following description that the lamps 161 are arranged to indicate to the workmen the condition of the tip interconnections made by him, while the lamps 162 and 163 serve to indicate the condition of the ring and sleeve interconnections, respectively.

Figure 11:
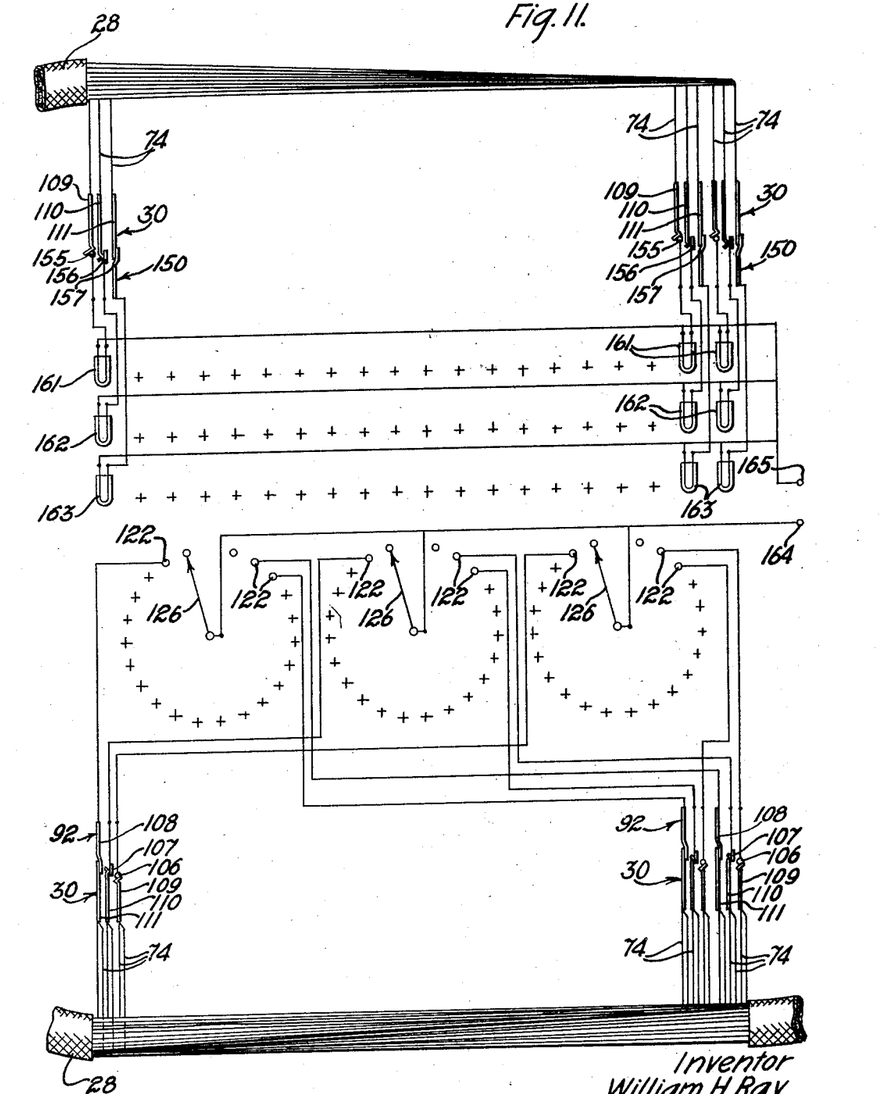
Fig. 11 shows, diagrammatically, a portion of an electrical operating circuit for the improved apparatus.

One form of an electrical operating circuit for the improved testing apparatus is shown diagrammatically in Fig. 11, the leads 164 and 165 serving to connect the electrical circuit with any suitable source of electrical energy (not shown). The contact brush 126 and the contact disk 127 are permanently interconnected with the lead 164 through the contact brush 136 and the bracket 134, as hereinbefore described. One terminal of each of the lamps 161, 162 and 163 are electrically connected to the lead 165 while the opposite terminal of each of the lamps 161, 162 and 163 are electrically connected to the tip, ring and sleeve contacting portions 155, 156 and 157, respectively, of the plugs 150. As hereinbefore described, the tip, ring and sleeve contacting portions of the plugs 92 are electrically connected to the contact springs 120 and pins 122 associated with the dials 113, 114 and 115, respectively. It is apparent, therefore, that by operating the knobs 117 to move the contact disks 127 into or out of engagement with the associated contact springs 120, the tip, ring and sleeve interconnections may be collectively or individually associated with the test lamps 161, 162 and 163, respectively.

The operation of the above described apparatus is as follows: A jack strip 30 is securely positioned between the blocks 36 and 37 with the terminals thereof facing forwardly as shown in Fig. 3. A cable form 28 is inserted in the right hand spring clip 54 and positioned upon the plate 50 so that one of its formed ends is disposed between the pins 49 and the pins 53, and the conductor leads 74 thereof are in alignment with the terminals of the jack strip. The workman then proceeds to thread the conductor leads to the apertured terminals in the usual manner, a suitable color scheme being usually provided to assist the operator in threading the tip, ring and sleeve contacting terminals with the proper conductor leads of the cable form. The conductor leads are then soldered to the terminals of the jack strip in the usual manner by means of a soldering iron (not shown) which is carried by the holder 84, when at rest.

The cable form and the jack strip connected at one end thereof are then removed from their individual supports and the jack strip is engaged with the plugs 150 in the manner hereinbefore described. The free end of the cable form is inserted in the left hand spring clip 54 and is positioned upon the plate 50 so that the formed portion thereof lies directly in front of the pins 53. A second cable form is then inserted in the right hand spring clip 54 and one end thereof is positioned upon the plate 50 so that the formed portion thereof is disposed between the pins 49 and the pins 53. A second jack strip 30 is securely positioned in the blocks 36 and 37 in a manner similar to that described in connection with the first jack strip. The handles 148 and 105 are then turned in clockwise and counter-clockwise directions, respectively, (Fig. 2) to engage the jacks of the first and second jack strips with the plugs 150 and 92, respectively. The workman then proceeds to interconnect the apertured terminals of the second jack strip with the conductor leads of the two cable forms in the usual manner. The above procedure is continued until a cable run having the required number of jacks has been completed. A portable rack 170 is provided for holding the cable run while being formed. The rack 170 may be removably supported by suitable framework attached to the member 21.

During the threading and soldering operations, the knobs 117 are disposed in their inwardly projected positions wherein the contact disks 127 thereof collectively engage the associated contact springs 120. Thus, while the individual conductors of a cable form are being interconnected with the associated terminals of the second and succeeding jack strips, the interconnections are constantly under test. For instance, assuming that the individual conductor leads 74 at one end of a cable form 28 have been interconnected with the associated tip, ring and sleeve contacting terminals of a jack strip and the jack strip has thereafter been engaged with the plugs 150 in the manner hereinbefore described, it will be obvious that as the individual conductor leads at the opposite end of the cable form are interconnected with the associated tip, ring and sleeve contacting terminals of the second and succeeding jack strips individual electrical circuits are completed, each of which causes the illumination of a test lamp which indicates to the workman the nature of the interconnection being made. Thus, while a tip contacting terminal 109 of the second or succeeding jack strip is being interconnected with the associated conductor lead of the cable form, an electrical circuit is completed, which as shown in Fig. 11, may be traced as follows: From the side 165 of the source of electrical energy through a test lamp 161, the tip contacting portion 155 of the associated plug 150, the associated tip contacting terminal 109 of the previously interconnected jack strip, the associated conductor 74 of the cable form 28, the tip contacting terminal with which the conductor 74 is being interconnected, the tip contacting portion 106 of the associated plug 92, the associated contact spring 122, the associated contact disk 127 and contact brush 136, and then to the opposite side 164 of the source of electrical energy. The completion of the circuit just described causes the test lamp 161 included therein to become illuminated, thus indicating to the operator that the interconnection being made is correct. It will be understood that an individual electrical circuit including a test lamp 161 as described above is associated with each tip contacting terminal of the jack strips. Thus the workman is apprised of the nature of each tip interconnection as it is being made.

In the same manner as described above in connection with the tip contacting terminals, the ring contacting terminals of the jack strips are also individually associated with electrical circuits, each of which includes a test lamp 162 and the sleeve contacting terminals of the jack strips are individually associated with electrical circuits, each of which includes a test lamp 163. It is obvious, therefore, that the workman is apprised of the nature of each individual interconnection while it is being made. Defects such as solder crosses and breaks in the individual conductors of the cable form are thus called to his attention immediately and may be conveniently and readily corrected.

It is thought that a better understanding of the invention will be had from the following description of several defects which may occur while making the tip, ring and sleeve interconnections and the manner in which such defects are immediately called to the attention of the workman. As shown in Fig. 3, the tip, ring and sleeve contacting terminals of the jack strips are necessarily positioned very close to each other. Because of this construction, it is obvious that while soldering a conductor to one of the terminals, a piece of solder may become bridged between the terminal being connected and an adjacent terminal thus causing a short which is sometimes called solder cross between the individual circuits including these terminals. Such a condition is obviously undesirable since it results in what is known as cross talk between the individual circuits. By employing the above described testing system, such conditions are immediately called to the attention of the workman. For example, if while soldering a conductor 74 with a tip contacting terminal 109, a piece of solder becomes bridged between the terminal 109 and an adjacent ring contacting terminal 110, the test circuit individually associated with the terminal 109 is completed, as hereinbefore described, and as a result thereof, the test lamp 161 included therein is illuminated. However, the solder cross or short between the terminals 109 and 110 completes a second electrical circuit which, by referring to Fig.

11, may be traced as follows: From the side 165 of the source of electrical energy through a test lamp 162, the ring contacting portion 156 of the associated plug 150, the associated ring contacting terminal 110 of the previously interconnected jack strip, the associated conductor 74 of the cable form 78, the tip contacting terminal with which the conductor 74 is being interconnected, through the solder to the adjacent ring contacting terminal 110, the ring contacting portion 107 of the associated plug 92, the associated contact spring 122, the associated contact disk 127 and contact brush 136, and then to the opposite side of the source of electrical energy. The completion of the circuit just described causes the test lamp 162 included therein to become illuminated, thus indicating to the operator that a short or solder cross has occurred between the circuit including the tip contacting terminals and the circuit including the ring contacting terminals of the jack strips.

Breaks in the individual conductors of the cable form are immediately called to the attention of the operator, since it is obvious that when such a condition exists the associated test circuit is not completed by the interconnection of the broken conductor with a terminal of the second or succeeding jack strips and therefore the test lamp included within the test circuit will not become illuminated when such an interconnection is made. The workman is thus immediately apprised of the existence of any breaks in the individual conductors interconnecting corresponding terminals of the jack strips.

After the soldering operation has been completed, the knobs 117 are moved outwardly to the positions shown in Fig. 4, whereby the completed interconnections may be individually tested by successively engaging the contact brush 126 with each of the contacts 122. By this test the workman may very readily discover any defects which he may not have noted during the soldering operation. All defects are corrected by the workman as noted so that the completed cable run is free from errors and ready for use, thereby eliminating the necessity of maintaining a repair force at a large expense. It is obvious, of course, that, if desired, the entire cable run may first be completely interconnected and then tested from jack to jack by the improved testing apparatus in the manner hereinbefore described.

What is claimed is:

1. In an apparatus for positioning parts of electrical apparatus for interconnection, individual means for positioning said parts while being interconnected, means for causing a relative movement between said positioning means, a system for testing an interconnection between said parts, a plurality of connecting terminals included in said testing system, means for causing a relative movement between said terminals and said parts to cause an engagement therebetween, and a test lamp included in said testing system for indicating the nature of an interconnection between the parts.

2. In an apparatus for positioning parts of electrical apparatus for interconnection, individual means for supporting said parts while being interconnected, means for causing a relative movement between said supporting means to accommodate variations in the sizes of the parts, a testing system including a plurality of connecting terminals adapted to engage the parts, and a test lamp included in the testing system and energized by an interconnection of the parts for indicating the nature of said interconnection.

3. In an apparatus for associating a jack terminal with an electrical conductor for interconnection therewith, individual means for positioning and supporting the terminal and the conductor, means for causing a relative movement between the last mentioned means to accommodate variations in the length of the conductor, a system for testing the nature of an interconnection between the terminal and the conductor, said system comprising an electrical circuit including a plug terminal adapted to engage the jack terminal, an indicating lamp included in said electrical circuit, and means for associating said indicating lamp with the jack terminal to indicate the nature of an interconnection between said jack terminal and the conductor.

4. In an apparatus for associating a plurality of jack terminals with a plurality of electrical conductors for interconnection therewith, individual means for supporting said terminals and said conductors, means for causing a relative movement between said supporting means to accommodate variations in the lengths of said conductors, a system for testing the nature of interconnections between the terminals and the conductors, said system comprising an electrical circuit including a plurality of plug terminals adapted to engage said jack terminals, a plurality of indicating lamps included in said electrical circuit, and means for selectively associating one of said indicating lamps with one of said jack terminals to indicate the nature of an interconnection between said jack terminal and its associated conductor.

5. A method of interconnecting and testing a plurality of electrical parts, consisting in establishing test conditions for indicating the nature of interconnections therebetween, and permanently interconnecting the parts during the maintenance of the test conditions.

6. In an apparatus for positioning parts of an electrical apparatus for interconnection, a system for testing the nature of the interconnections between the parts, and common means selectively operable for sequentially and collectively associating the interconnections with the testing system.

7. In an apparatus for associating a plurality of jack terminals with a plurality of electrical conductors for interconnection therewith, individual means for positioning the terminals and the conductors while being interconnected, means for causing a relative movement of the positioning means to accommodate variations in the lengths of the conductors, a system for testing the nature of interconnections between the terminals and the conductors, and common means selectively operable for sequentially and collectively associating the interconnections with the testing system.

In witness whereof, I hereunto subscribe my name this 26th day of March A. D., 1926.

WILLIAM HARRY RAY.